Feb. 16, 1971

R. E. GADBERRY 3,564,387

AC/DC CONVERTER

Filed June 19, 1969

2 Sheets-Sheet 1

INVENTOR
RICHARD E. GADBERRY

BY

Drummond, Cahill & Phillips

ATTORNEYS

INVENTOR
RICHARD E. GADBERRY
BY
Drummond, Cahill & Phillips
ATTORNEYS

United States Patent Office 3,564,387
Patented Feb. 16, 1971

3,564,387

AC/DC CONVERTER

Richard E. Gadberry, Mesa, Ariz., assignor to Dickson Electronics Corporation, a corporation of Arizona Filed June 19, 1969, Ser. No. 834,676
Int. Cl. H02m 7/00; H03k 5/00
U.S. Cl. 321—8 7 Claims

ABSTRACT OF THE DISCLOSURE

A converter for receiving audio frequency alternating current signals and producing a direct current output signal proportional to the AC signal in response thereto. An operational amplifier is direct connected to receive the AC signal and is provided with a feedback arrangement in a bootstrapping configuration. The output of the bootstrapped operational amplifier is applied through a coupling capacitor to a second operational amplifier that may have a desired gain greater than unity. The signal thus applied at the input of the converter is utilized by the first operational amplifier to drive the capacitor coupling succeeding stages; the output of the second operational amplifier is rectified and integrated to produce a DC analogue quantity proportional to the AC audio frequency amplitude applied to the converter.

This invention pertains to converters of the type for receiving alternating current and deriving a direct current analogue output signal therefrom.

The prior art converters have universally utilized capacitive coupling into the converter in an attempt to eliminate problems associated with the input alternating current when the input is superimposed on a DC level. These prior art converters generally lack the combination of high input impedance with the ability to resolve millivolt signals coupled with fast settling time when the AC signal input is in the presence of a DC level. When an AC input signal is rapidly changed or is suddenly applied, prior art converters sensitive to millivolt input signals generally require anywhere from 1.5 seconds to 5 seconds to "settle." In applications where the converter is to be used for repetitive successive operations, such as testing component electronic parts, the delay renders the utilization of the converter time-consuming and expensive.

It is therefore an object of the present invention to provide an AC/DC converter that will provide a high input impedance to an AC audio input signal superimposed upon a DC level.

It is another object of the present invention to provide an AC/DC converter sensitive to millivolt AC input signals superimposed on a DC level.

It is still another object of the present invention to provide an AC/DC converter that will exhibit fast settling time even though the millivolt AC input signal is superimposed on a DC level.

These and other objects of the present invention will become apparent to those skilled in the art as the description thereof proceeds.

Briefly, in accordance with the embodiment chosen for illustration, an operational amplifier is used as an input stage and is direct connected to the input terminal of the converter. The input to the operational amplifier provides a DC as well as an AC current path. The operational amplifier output is base connected to a pair of transistors having coupled emitters which are also connected to the input of a succeeding stage. The first operational amplifier and its connected transistors form a bootstrapped voltage follower of unity gain with extremely high input impedance and low output impedance for driving a coupling capacitor coupling the first stage to a second operational amplifier. The second operational amplifier is chosen to have a gain of 10 and is connected to a rectifier for rectifying the resulting amplified AC signal. The amplified AC signal is integrated to provide a smooth DC analogue quantity output that is proportional to the AC signal input.

The present invention may more readily be described by reference to the accompanying drawings, in which.

Figure 1:
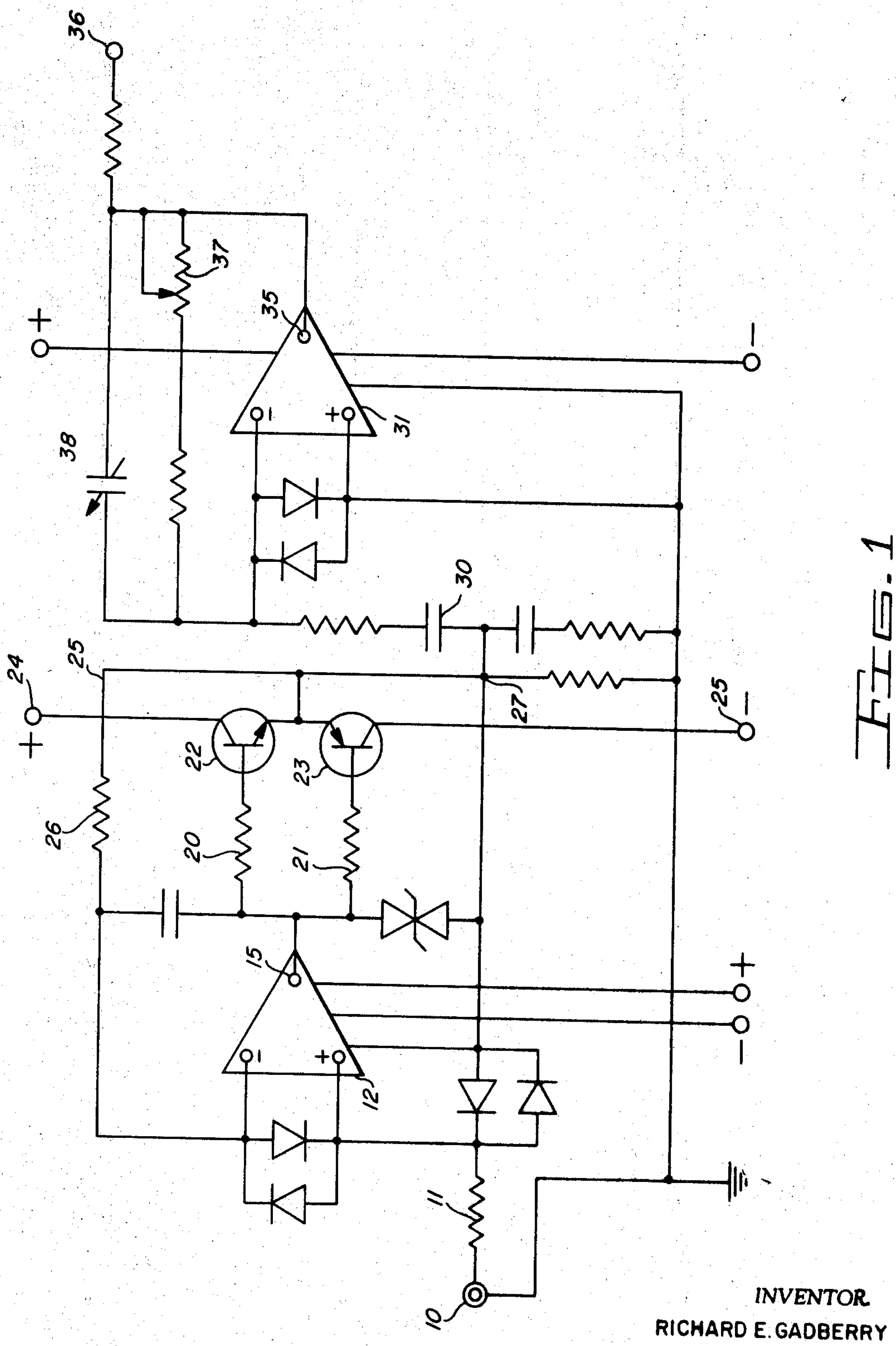
FIG. 1 is a schematic circuit diagram of a portion of an AC/DC converter constructed in accordance with the teachings of the present invention showing the first two stages thereof.

Referring now to FIG. 1, an input terminal 10 is shown connected through a resistor 11 to an operational amplifier 12. The amplifier 12 may be any of several well known commercially available operational amplifier circuits, the construction and operation of which are well known and need not be discussed here. The output terminal 15 of the amplifier 12 is connected through resistors 20 and 21 to the base electrodes of transistors 22 and 23. The transistors are complementary, with transistor 22 being an NPN type and the transistor 23 being a PNP type. The emitter-collector circuits of transistors 22 and 23 are connected by interconnecting the emitters thereof and the collectors are connected to a suitable voltage supply at terminals 24 and 25. The emitters of the transistors 22 and 23 are also connected through conductor 25 and resistor 26 in a feedback loop to the input of the amplifier 12. The emitters of transistors 22 and 23 are also connected to a terminal 27. The voltage occurring at terminal 27 will be a faithful reproduction of audio frequency AC and DC level input applied to the input terminal 10. The operational amplifier 12 and associated circuitry act as a voltage follower with unity gain and provide a high input impedance at the terminal 10. The terminal 27 is connected through a coupling capacitor 30 to a second operational amplifier 31. The amplifier 31 may conveniently be utilized to provide amplification greater than unity and, in the embodiment chosen for illustration, the gain is equal to 10. The input to the operational amplifier 31 is therefore the audio frequency AC component without the DC level. Since the terminal 27 is effectively driven by the operational amplifier 12 and its associated circuitry, the delay incurred by the requirement of the coupling capacitor 30 to settle has been drastically reduced. In the embodiment chosen for illustration, the settling time is only 2% to 10% of the settling time required in prior art converter systems.

Figure 2:
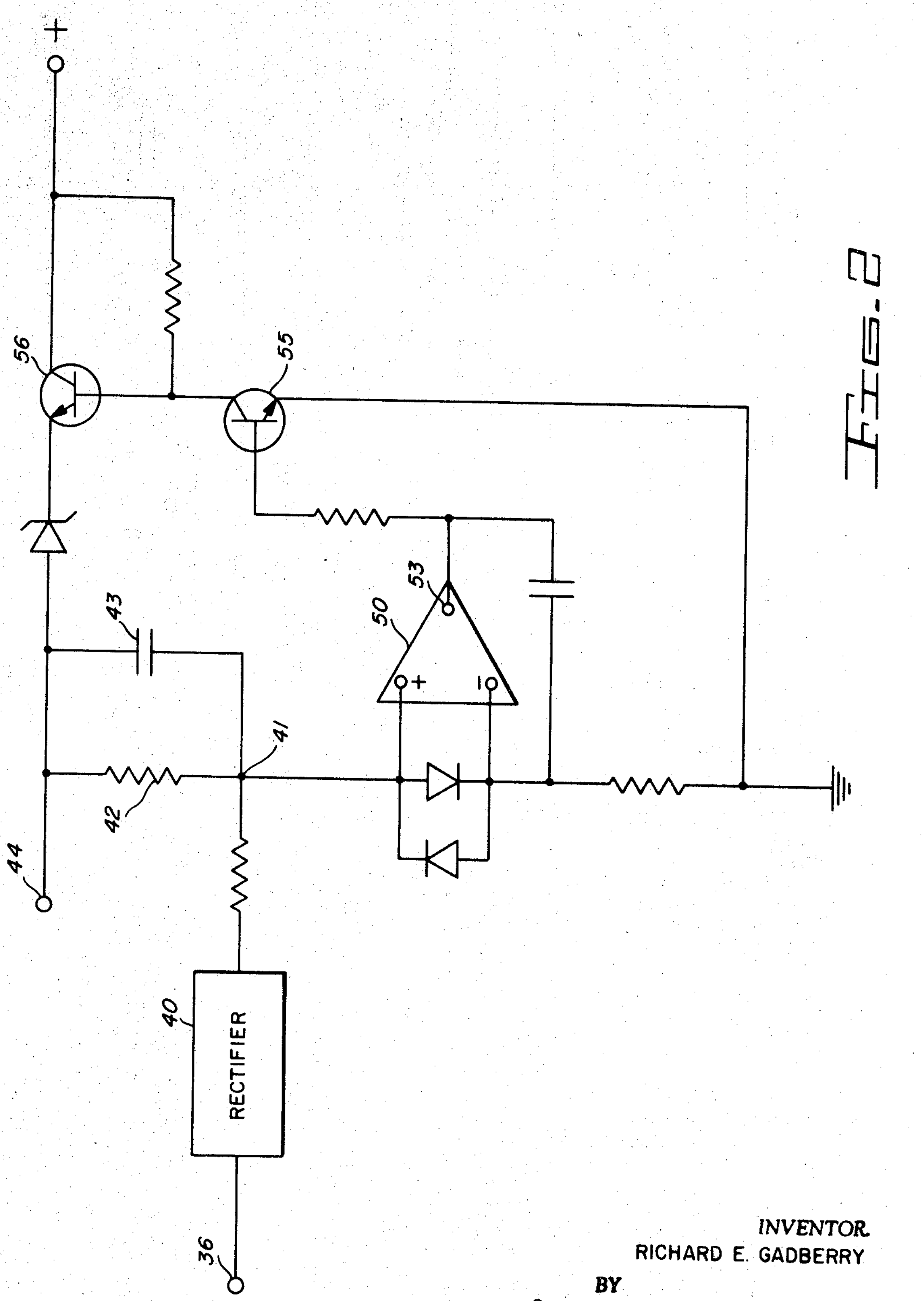
FIG. 2 is a schematic circuit diagram showing the remainder of the AC/DC converter.

The output terminal 35 of the amplifier 31 is connected to a terminal 36 for convenience when referring to FIG. 2. The calibrating potentiometer 37 and a frequency adjusting variable capacitor 38 may be incorporated in the feedback path of the amplifier 31.

Referring now to FIG. 2, the terminal 36 may be assumed coincident with the terminal 36 of FIG. 1. The amplified alternating current signal present at the terminal 36 is rectified by a rectifier 40. The form of the rectifier is not material to the practice of the present invention and the design and operation of rectifying systems are felt sufficiently basic to negate discussion at this point. The rectifier rectifies the AC signal applied at the input thereof and provides the rectified signal to the terminal 41. An integrating circuit, including resistor 42 and capacitor 43, smooths the rectified signal applied thereto and provides a DC analogue quantity at the output terminal 44. The signal occurring at terminal 41 is also applied to an operational amplifier 50. The output terminal 53 of the amplifier 50 is connected to the base electrode of a transistor 55 having its collector connected to the base electrode of a second transistor 56. The circuitry thus described in combination with the integrating components 42 and 43 provide a very low output impedance at the terminal 44. Essentially, the amplifier 50 and its associated circuitry acts as a voltage follower for the terminal 41 to provide current boosting at the terminal 44.

It may therefore be seen that an AC input voltage at the converter input terminal 10 superimposed on a DC level will result in a DC analogue quantity present at the terminal 44 equal to 10 times the AC component present at the input terminal 10. It will be obvious to those skilled in the art that the DC analogue quantity may be changed while retaining its proportionality to the AC input by varying the amplification provided by the second operational amplifier 31. It will also be obvious to those skilled in the art that the configuration of the operational amplifiers is not critical to the practice of the present invention.

I claim:

1. An AC/DC converter for receiving audio frequency AC signals and producing a DC output signal in response thereto, comprising: a converter input terminal; a unity gain operational amplifier having an input terminal and an output terminal; means connecting said converter input terminal to said operational amplifier input terminal to provide a current path for alternating and direct current; a transistor having a base electrode and an emitter-collector circuit, means connecting said operational amplifier output terminal to said base electrode and means connecting said emitter-collector circuit in a feedback loop to said operational amplifier input terminal; a second operational amplifier having an input terminal and an output terminal; a coupling capacitor having an input terminal and an output terminal; means connecting said input terminal of said coupling capacitor to said emitter-collector circuit and means connecting said output terminal of said coupling capacitor to the input terminal of said second operational amplifier; rectifying and integrating means connected to the output terminal of said second operational amplifier for rectifying and integrating an AC output signal therefrom to provide a DC analogue quantity proportional to the amplitude of an AC signal applied to said converter input terminal.

2. The combination set forth in claim 1, wherein said second operational amplifier has a gain of greater than 1.

3. The combination set forth in claim 1, wherein said second operational amplifier has a gain equal to 10.

4. The combination set forth in claim 1, wherein said transistor is a PNP type and wherein a second transistor of complementary type is base connected to said operational amplifier output terminal with the emitters of said transistors connected together and to said operational amplifier input terminal to form a feedback loop.

5. The combination set forth in claim 1, wherein said rectifying and integrating means includes a third operational amplifier connected to receive AC output signals from said second operational amplifier.

6. The combination set forth in claim 2, wherein said transistor is a PNP type and wherein a second transistor of NPN type is base connected to said operational amplifier output terminal with the emitters of said transistors connected together and to said operational amplifier input terminal to form a feedback loop.

7. The combination set forth in claim 6, wherein said rectifying and integrating means includes a third operational amplifier connected to receive AC output signals from said second operational amplifier.

References Cited

UNITED STATES PATENTS 3,381,203 4/1968 Mitchell ............ 321—8
3,491,252 1/1970 Petrohilos ............ 328—26

WILLIAM H. BEHA, Jr., Primary Examiner

U.S. Cl. X.R.

328—26; 330—10